3,001,974
COPOLYMERS OF BETA-CYANOVINYLAMINES
Everett J. Frazza, Yorktown Heights, N.Y., and John A. Price, Swarthmore, Pa., assignors to American Cyanamid Company, New York, N.Y., a corporation of Maine
No Drawing. Filed Dec. 24, 1957, Ser. No. 704,873
13 Claims. (Cl. 260—85.5)

This invention relates broadly to new and useful compositions of matter and, more particularly, to a new and useful class of copolymers. Still more particularly, the invention is concerned with compositions comprising a copolymer of copolymerizable ingredients including (1) a beta-cyanovinylamine represented by the general formula (I)

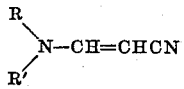

where R represents an alkyl (including cycloalkyl) radical and R' represents a member of the class consisting of hydrogen and alkyl (including cycloalkyl) radicals, and (2) a compound that contains a $CH_2=C<$ grouping. The scope of the invention also includes method features.

Illustrative examples of radicals represented by R and R' in the above formula, and which may be the same or different, are methyl, ethyl, propyl, isopropyl, n-butyl, isobutyl, sec.-butyl, tert.-butyl, and the various normal and isomeric amyl, hexyl, heptyl, octyl, nonyl, and decyl radicals, and the higher members of the homologous series, for instance up to and including the octadecyl radical; also, cyclopentyl, methylcyclopentyl, cyclohexyl, cycloheptyl, cyclooctyl, etc. The use of beta-cyanovinylamines where R and/or R' represent an alkyl radical containing more than 18 carbon atoms (that is, higher than octadecyl), e.g., alkyl radicals containing 19 through 30 carbon atoms, is not precluded; but such cyanovinylamines are generally less suitable for use in practicing the present invention because, for one reason, of the greater difficulty in causing such compounds to copolymerize with a compound that contains a $CH_2=C<$ grouping.

It is one of the primary objects of the present invention to provide a new class of copolymers or interpolymers for use in industry.

Another object of the invention is to provide a new class of synthetic compositions which are especially suitable for use in the plastics, coating, adhesive, laminating, molding, fiber-forming, and other arts.

Another object of the invention is the production of new acrylonitrile copolymer compositions which are more readily both fabricated (e.g., in fiber or other form) and dyed, especially with an acid dye, than homopolymeric acrylonitrile and many of the previously known or suggested copolymers of acrylonitrile in which a non-basic monomer has been incorporated as a part of the copolymer molecule.

Another object of the invention is to prepare such copolymers which can be spun or otherwise shaped to form filaments, tapes, ribbons, rods, tubes, sheets, etc., and the shaped articles then dyed either before or after having been oriented or treated to improve their useful properties.

Still another object of the invention is to increase the field of utility of beta-cyanovinylamines of the kind embraced by Formula I.

Other objects of the invention will be apparent to those skilled in the art from the description and examples which follow.

The foregoing objects are attained by polymerizing, with the aid of a polymerization catalyst, a polymerizable composition comprising (1) a beta-cyanovinylamine of the kind embraced by Formula I, and (2) a compound that contains a $CH_2=C<$ grouping, e.g., acrylonitrile, and by making articles or products, e.g., oriented fibers, from the resulting copolymer compositions.

The beta-cyanovinylamines used in practicing the present invention are believed to be new chemical compounds. They are members of a broader class of beta-cyanovinylamines that are more fully described and are broadly and specifically claimed in the copending application of Everett J. Frazza and Lorence Rapoport, Serial No. 704,878, filed concurrently herewith. In general, they can be prepared by reacting beta-chloroacrylonitrile with an amine, corresponding to the beta-cyanovinylamine desired, in an inert reaction medium, preferably in the presence of (i.e., in contact with) a hydrogen chloride acceptor. On completion of the reaction, which is effected at below about 100° F., the precipitate is separated by conventional means and the beta-cyanovinylamine is recovered from the residual liquor by any suitable means, e.g., by distillation or crystallization. Reference is made to the aforementioned Frazza et al. copending application for more detailed information and, also, to the examples which follow illustrating the preparation of specific beta-cyanovinylamines.

Homopolymers of the beta-cyanovinylamines used in practicing the present invention, if they can be produced at all, require special polymerization techniques. We have not been able to prepare them by conventional polymerization methods and catalytic influences. Surprisingly, however, they undergo copolymerization reactions, with no great difficulty, with compounds containing a $CH_2=C<$ grouping. This was quite surprising and unexpected and in no way could have been predicted. The amount of beta-cyanovinylamine of the kind embraced by Formula I that is copolymerized with a compound containing a $CH_2=C<$ grouping may be considerably varied; for example, particularly useful compositions are obtained when the beta-cyanovinylamine constitutes from about 2% to about 60% by weight of the mixture of copolymerizable ingredients. More specific ranges of proportions are given hereinafter.

The copolymers of this invention, especially the acrylonitrile copolymers, have particular and peculiar properties that make them especially valuable for use in industry. In general, the beta-cyanovinylamine imparts basic characteristics to the copolymer so that it is more amenable to dyeing, especially with acid dyes, in fiber, sheet, or other form. Furthermore, the cyano group is conducive to the obtainment of improved properties, e.g., higher stretchability without breaking, higher tensile strength values, and more wool-like properties, as well as other improvements, in fibers made from copolymers of acrylonitrile and the beta-cyanovinylamine, especially those obtained by polymerization of comonomers, including acrylonitrile and the beta-cyanovinylamine, in the ratio of, by weight, from about 70% to about 95% of the former to from about 5% to about 30% by weight of the latter.

Examples of monomers containing a $CH_2=C<$ grouping that can be copolymerized with a beta-cyanovinylamine of the kind embraced by Formula I, singly or a plurality (two, three, four, or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, ethallyl, 1-phenylallyl, butenyl, etc., esters of saturated and unsaturated, aliphatic and aromatic, monobasic and polybasic acids such as, for instance, acetic, propionic, butyric, valeric, caproic, acrylic, and alpha-substituted acrylic (including alkacrylic, e.g., methacrylic, ethacrylic, propacrylic, etc., and arylacrylic, e.g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terephthalic, benzoylphthalic, etc., acids; the saturated monohydric alcohol esters, e.g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e.g., styrene, o-, m- and p-chlorostyrenes, -bromostyrenes, -fluorostyrenes, -methylstyrenes, -ethylstyrenes, -cyanostyrenes, the various poly-substituted styrenes such as, for example, the various di-, tri- and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e.g., alpha-methyl styrene, alpha-methyl-para-methyl styrene, etc.; unsaturated ethers, e.g., ethyl vinyl ether, diallyl ether, ethyl methallyl ether, etc.; unsaturated amides, for instance N-allyl caprolactam, acrylamide, and N-substituted acrylamides, e.g., N-methylol acrylamide, N-(2-hydroxyethyl) acrylamides, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc.; butadienes, e.g., 1,3-butadiene, 2-chlorobutadiene, etc.; unsaturated polyhydric alcohol (e.g., butenediol, etc.) esters of saturated and unsaturated, aliphatic and aromatic, monobasic and polybasic acids, illustrative examples of which appear above.

Other examples of monomers that can be copolymerized with a compound of the kind embraced by Formula I are the vinyl halides, more particularly vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added if needed in order to improve the compatibility and copolymerization characteristics of the mixed monomers.

Other and more specific examples of monomeric materials which can be mixed or blended with the beta-cyanovinylamine used in practicing our invention and the resulting homogeneous or substantially homogeneous, polymerizable composition then polymerized, as hereinafter more fully described, to yield new and valuable copolymer compositions are the allyl compounds and especially those which have a boiling point of at least about 60° C. Of the monomeric materials which may be used the allyl esters form a large class, all of which are suitable. The reactive allyl compounds employed are preferably those which have a high boiling point such as, for example, diallyl maleate, diallyl fumarate, diallyl phthalate, diallyl succinate, etc. Other allyl compounds which are not necessarily high boiling may be used.

More specific examples of allyl compounds that can be copolymerized with a compound of the kind embraced by Formula I are allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl, cyanurate, triallyl citrate, triallyl phosphate, trimethallyl phosphate, tetrallyl silane, tetrallyl silicate, hexallyl disiloxane, etc.

Among the comonomers which are preferred for use in carrying our invention into effect are the vinyl compounds, including the vinyl and isopropenyl aromatic compounds, more particularly the vinyl and isopropenyl aromatic hydrocarbons (e.g., styrene, isopropenyl toluene, the various dialkyl styrenes, etc.), and the vinyl aliphatic compounds, e.g., acrylonitrile, acrylamide, etc., and other compounds containing a $CH_2\!\!=\!\!C\!<$ grouping, e.g., the various substituted acrylonitriles (e.g., methacrylonitrile, ethacrylonitrile, phenylacrylonitrile, etc.), the various substituted acrylamides (e.g., methacrylamide, ethacrylamide, the various N-substituted acrylamides and alkacrylamides, for instance N-methylol acrylamide, N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides, and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenyl acrylic acid, etc., more particularly the alkyl esters of an acrylic acid, e.g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above.

Additional examples of different monoethylenically unsaturated substances that can be added to the polymerizable mixture of copolymerizable ingredients, and are particularly useful in the production of modified beta-cyanovinylamine-acrylonitrile copolymers, include the various vinylpyridines, which are vinyl-substituted heterocyclic tertiary amines (sometimes designated as vinyl-substituted tertiary heterocyclic amines), and more particularly vinylpyridines represented by the general formula (IA) 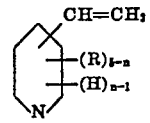

wherein R represents a lower alkyl radical, and $n$ represents an integer from 1 to 5, inclusive. Examples of radicals represented by R are the methyl, ethyl, propyl (including n-propyl and isopropyl) and butyl (including n-butyl, isobutyl, sec.-butyl and tert.-butyl) radicals. Examples of vinylpyridines embraced by the above formula are 2-vinylpyridine, 3-vinylpyridine, 4-vinylpyridine, 2-methyl-3-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine, 3-methyl-4-vinylpyridine, 2-vinyl-4,6-dimethylpyridine, and 2-vinyl-4,6-diethylpyridine.

Other examples of vinyl-substituted heterocyclic tertiary amines that can be used are the various isomeric vinylpyrazines, vinylquinolines (including the 2- and 4-vinylquinolines), vinyloxazoles, vinylimidazoles, and vinylbenzoxazoles.

In lieu of, or in addition to, a vinyl-substituted heterocyclic tertiary amine as a third different monoethylenically unsaturated substance which is added to an acrylonitrile-containing polymerizable mixture, one can use other such substances to impart specific improvements in properties to an acrylonitrile copolymer, e.g., vinyl acetate where better color and/or color stability under heat, or better spinning characteristics, may be desired; or acrylamide when it is desired that fibers made from the copolymer have improved union dyeability with wool; or, for instance, methyl acrylate, acrylic acid, methacrylic acid, dimethylaminopropylacrylamide, methacrylamide, hydroxyethyl methacrylate, methacrylonitrile, dimethylaminoethyl acrylate, etc., when it is desired to impart still other distinctive and desirable properties, or combination of properties, to the copolymer.

In making the acrylonitrile ternary polymers of the invention, the acrylonitrile generally constitutes from, by weight, about 70% to about 98% by weight of the monomeric mixture; the beta-cyanovinylamine, from about 1% to about 15% by weight thereof; and the third different monoethylenically unsaturated substance containing a $CH_2=C<$ grouping, also from about 1% to about 15% by weight thereof.

Other examples of copolymerizable substances that can be employed alone or in conjunction with one or more compounds containing a $CH_2=C<$ grouping include the polymerizable unsaturated alkyd resins (modified or unmodified), e.g., ethylene glycol maleate, diethylene glycol maleate phthalate, ethylene glycol maleate succinate and diethylene glycol maleate linoleate. Other and more specific examples of unsaturated alkyd resins that can be used are given, for example, in Nyquist and Kropa Patent No. 2,503,209, dated April 4, 1950, and patents referred to therein (see, for instance, column 8, lines 1–64).

Still other examples of materials that can be copolymerized with a beta-cyanovinylamine of the kind embraced by Formula I are given in Kropa Patent No. 2,510,503 (e.g., column 2, line 46, to the end of the sentence in line 16, column 3; column 5, line 54, through line 46, column 7; and column 13, line 42, through line 30, column 16); and in the aforesaid Nyquist et al. Patent No. 2,503,209 (see, for instance, column 5, line 67, through line 75, column 7; and column 9, line 74, through line 12, column 11).

Any suitable means may be used in effecting polymerization of the polymerizable composition from which are produced the polymers of this invention. Advantageously, a polymerization catalyst is employed, and the polymerization reaction is effected under non-aqueous conditions, that is, by known bulk-polymerization technique or while the monomers are dissolved or dispersed in an organic solvent or diluent, e.g., benzene, toluene, xylene, etc. The polymerization can be effected by batch, semi-continuous or continuous techniques, and at atmospheric or superatmospheric pressures.

In general, any of the polymerization catalysts which are suitable for use in polymerizing compounds containing an ethylenically unsaturated grouping, specifically a vinyl grouping, can be used. Particularly useful are the so-called "free-radical" catalysts, of which benzoyl peroxide (a peroxy catalyst) and alpha, alpha'-azodiisobutyronitrile (an azo catalyst) are typical examples.

Additional examples of peroxy type of free-radical catalysts are the various organic peroxy catalysts, illustrative examples of which latter are: the dialkyl peroxides, e.g., dipropyl peroxide, dibutyl peroxide, dilauryl peroxide, dioleyl peroxide, distearyl peroxide, di-(tert.-butyl) peroxide, and di-(tert.-amyl) peroxide; the alkyl hydrogen peroxides, e.g., tert.-butyl hydrogen peroxide (tert.-butyl hydro-peroxide), tert.-amyl hydrogen peroxide (tert.-amyl hydro-peroxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; urea peroxide; the various organic solvent-soluble percarboxylic acids; organic solvent-soluble percarbonates, persulfates, perborates, etc.; and others that will be apparent to those skilled in the art from the foregoing examples.

Additional examples of azo type of free-radical catalysts include the following:
Dimethyl alpha,alpha'-azodiisobutyrate
Alpha,alpha'-azobis (alpha-methylbutyronitrile)
Alpha,alpha'-azobis (alpha-ethylbutyronitrile)
Alpha,alpha'-azobis (alpha,gamma-dimethylvaleronitrile)
Alpha,alpha'-azobis (alpha-methylvaleronitrile)
Alpha,alpha'-azobis (alpha-methylcapronitrile)
Alpha,alpha'-azobis (alpha-n-butylcapronitrile)
Alpha,alpha'-azobis (alpha-isobutyl-gamma-methylvaleronitrile)
Alpha,alpha'-azobis (alpha-isopropyl-beta-methylbutyronitrile)
Alpha,alpha'-azobis (alpha,beta-dimethylbutyronitrile)
Alpha,alpha'-azobis (alpha,gamma-dimethylcapronitrile)
1,1'-azodicyclopentanecarbonitrile Reference is made to Hunt U.S. Patent No. 2,471,959, dated May 31, 1949, for additional examples and for a generic description of compounds of this class.

The concentration of the catalyst is relatively small, e.g., from, by weight, about 1 part of catalyst per 1,000 parts of the monomeric composition to about 4 or 5 parts of catalyst per 100 parts of the monomeric compositions.

The polymerization reaction may be effected, if desired, while the reaction mass is maintained under an atmosphere of an inert gas, for example nitrogen, helium, carbon dioxide, etc.; or, it may be (but preferebly is not) carried out under an atmosphere of air.

The temperature at which the monomeric material is polymerized can be varied over a wide range, up to and including or slightly above the boiling point (at atmospheric pressure) of the monomeric material. In most cases, the polymerization temperature will be within the range of about 35° or 40° C. up to the boiling temperature of the reaction mass, depending upon, for example, the particular catalyst used, the rapidity of polymerization wanted and other influencing factors. The use of polymerization temperatures substantially above the boiling point of the reaction mass is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

The polymers of this invention can be produced in various molecular weights as desired or as conditions may require. Thus, the fiber-forming copolymers, more particularly the fiber-forming acrylonitrile copolymers, ordinarily are within the M.W. range of about 15,000 to about 300,000 or higher as calculated from viscosity measurements using the Staudinger equation (reference: U.S. Patent No. 2,404,713). Homogeneous acrylonitrile copolymers having an average molecular weight of between about 60,000 and 90,000 and which contain at least 70%, advantageously from about 85% to about 95% of acrylonitrile (combined acrylonitrile) in the molecule, are especially suitable for use in making dyeable, oriented fibers by wet- or dry-spinning methods.

If the coyolymerization reaction is carried out while the mixed monomers are dissolved or dispersed in a liquid medium, the resulting copolymer then is separated from the said medium by any suitable means, e.g., by filtration, centrifuging, solvent extraction, etc.

The proportions of the beta-cyanovinylamine and polymerizable material which is copolymerized therewith may be varied as desired or as conditions may require, but ordinarily the proportions thereof in the polymerizable mixture will be within the range of, by weight, from about 5% to about 50% of the former to from about 95% to about 50% of the latter, more particularly from about 5 or 10% to about 30 or 40% of the former to from about 90 or 95% to about 60 or 70% of the latter.

However, the use of higher or lower percentage proportions than those just mentioned is not precluded.

In order that those skilled in the art may better understand how the present invention can be carried into effect, the following examples are given by way of illustration and not by way of limitation. All parts and percentages are by weight unless otherwise stated.

EXAMPLE 1

A. *Preparation of dimethyl beta-cyanovinylamine*

To a stirred solution of 135.3 parts of dimethylamine in 400 parts of benzene at 0°C. is added 87.5 parts of beta-chloroacrylonitrile during a period of 65 minutes, while maintaining the temperature below 15° C. After standing for three hours, 150 parts of benzene and 400 parts of ether are added, and the by-product amine hydrochloride is removed by filtration. The ether is removed at reduced pressure, and the residue is washed three times with saturated sodium chloride solution. The benzene solution is then distilled, giving 110.6 parts (77% of the theoretical) of dimethyl beta-cyanovinylamine as a pale yellow liquid boiling at 93°–99° C./0.6–1.0 mm.; $n_D^{25}$ 1.5308.

B. *Preparation of a copolymer of acrylonitrile and dimethyl beta-cyanovinylamine*

| | Parts |
|---|---|
| Acrylonitrile | 180 |
| Dimethyl beta-cyanovinylamine | 20 |
| Benzene | 537 |
| Alpha,alpha'-azodiisobutyronitrile (polymerization catalyst) | 2 | are heated together under reflux at the boiling temperature of the reaction mass for one hour. At the end of this period, the copolymer of acrylonitrile and dimethyl beta-cyanovinylamine that is formed is separated by filtration through a Büchner funnel, washed first with methanol and then with ether, after which it is air-dried to a constant weight.

EXAMPLE 2

Same as in Example 1-B, with the exception that 95 parts acrylonitrile and 5 parts dimethyl beta-cyanovinylamine are used in one test, and 85 parts acrylonitrile and 15 parts dimethyl beta-cyanovinylamine are used in another test. Similar results are obtained.

EXAMPLE 3

A. *Preparation of di-n-propyl beta-cyanovinylamine*

Thirty-five parts of beta-chloroacrylonitrile is added during a period of 65 minutes to a solution, 121.4 parts of di-n-propylamine in 125 parts of benzene, while maintaining the temperature of the reaction mixture at 30°–40° C. After addition of 450 parts of ether, the mixture is filtered, and the solvents are removed at atmospheric pressure. Two distillations at reduced pressure give 57.4 parts (93% of the theoretical) of di-n-propyl beta-cyanovinylamine, a light-yellow liquid boiling at 107°–109.5° C./0.3 mm.; $n_D^{25}$ 1.5065.

B. *Preparation of a copolymer of acrylonitrile and di-n-propyl beta-cyanovinylamine*

| | Parts |
|---|---|
| Acrylonitrile | 180 |
| Di-n-propyl beta-cyanovinylamine | 20 |
| Water | 1800 |
| Ethanol | 390 |
| Alpha,alpha'-azodiisobutyronitrile | 2 | are charged to a reaction vessel provided with a reflux condenser and heated therein at the boiling temperature of the reaction mass for two hours. The resulting, light tan-colored copolymer of acrylonitrile and di-n-propyl beta-cyanovinylamine is collected on a Büchner funnel, washed first with 1000 parts of water and then with 1000 parts of methanol, after which it is air-dried to a constant weight.

EXAMPLE 4

| | Parts |
|---|---|
| Acrylonitrile | 50 |
| Di-n-propyl beta-cyanovinylamine | 50 |
| Alpha,alpha'-azodiisobutyronitrile | 1 | are heated together in a reaction vessel provided with a reflux condenser and kept on a steam bath for three hours. The resulting copolymer is slurried twice with two portions of 160 parts each of methanol, washed with ether, and then air-dried to a constant weight.

EXAMPLE 5

Samples of homopolymeric acrylonitrile and of the acrylonitrile copolymers of Examples 1–B, 2 (both samples), 3–B, and 4 are subjected to the following dye test: A sample (5 parts) of the dry homopolymer or copolymer is added to a dye bath consisting of 500 parts of an aqueous solution containing 0.2 part of sulfuric acid, 1 part of sodium sulfate, and 0.2 part of Calcocid Alizarine Blue SAPG (Color Index No. 1054). The dye bath is boiled for 30 minutes, after which the polymerization product is filtered off and washed with hot water until the water is free of dye. The acrylonitrile copolymers of the aforementioned examples are dyed varying shades of blue, whereas the homopolymeric acrylonitrile fails to absorb any dye. The advantage of modifying an acrylonitrile polymerization product by replacing a part (e.g., from about 1% to about 30%, still more particularly from 2 or 3% to 10 or 15%) of the initial acrylonitrile with a beta-cyanovinylamine of the kind embraced by Formula I, thereby to obtain a polymeric substance of improved dyeability, is therefore quite apparent. Such improvements in dye receptivity also prevail in the case of acrylonitrile copolymers containing higher percentage proportions of the aforementioned beta-cyanovinylamine, e.g., 50–75% or more by weight of the copolymer molecule.

EXAMPLE 6

A spinning solution is prepared by dissolving 49 parts of an acrylonitrile copolymer (obtained by polymerizing a mixture of 95% acrylonitrile and 5% dimethyl beta-cyanovinylamine as in Example 2) in a concentrated aqueous solution of sodium thiocyanate (about 49% NaSCN in water). The resulting solution is filtered, placed under vacuum, and allowed to deaerate for three days. The concentration of copolymer in this solution is about 12%.

The spinning solution thereby obtained is spun into a fiber by extruding it through a spinneret having 45 holes, each 75 microns in diameter, into a coagulating bath comprising water maintained at a temperature of about 0° C. The freshly spun fiber in gel state is continuously passed over a pair of converging wash rolls while it is advancing in a helical path. The fiber is rinsed with water on the rolls to remove excess thiocyanate. The washed fiber is stretched 750%, for example by passing it through a bath of hot water maintained at a temperature of about 99.5° C., followed by drying on converging drying rolls while it is moving in a helical path toward the take-off end, as is more fully described in Cresswell et al. Patent No. 2,558,733.

EXAMPLE 7

A. *Preparation of mono-n-butyl beta-cyanovinylamine*

(II)
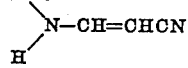

To a stirred solution of 87.8 parts of n-butylamine in 125 parts of benzene is added 35.0 parts of beta-chloroacrylonitrile during a period of 30 minutes, while maintaining the temperature at 35°–40° C. After an additional 15 minutes, the mixture is diluted to 1500 parts with ether and the precipitate filtered off. Distillation of the filtrate gives two cuts (1) 8.5 parts, B.P. 100°–121° C./0.25–0.35 mm. and (2) 14.8 parts, B.P. 121° C./0.2–0.25 mm., a total of 23.3 parts (47% of the theoretical) of pale yellow mono-n-butyl-beta-cyanovinylamine; $n_D^{25}$ 1.5089.

B. *Preparation of a copolymer of ethyl acrylate and mono-n-butyl beta-cyanovinylamine*

| | Parts |
|---|---|
| Ethyl acrylate | 45.0 |
| Mono-n-butyl beta-cyanovinylamine | 5.0 |
| Anhydrous toluene | 50.0 |
| Alpha,alpha'-azodiisobutyronitrile | 0.25 | are heated together under reflux at the boiling temperature of the mass for four hours, yielding a toluene solution of a copolymer of ethyl acrylate and mono-n-butyl beta-cyanovinylamine. This solution, diluted with toluene to, say, 10% copolymer solids is useful in treating wool-containing fabrics to reduce their felting and shrinking tendencies.

EXAMPLE 8

Same as in Example 7, with the exception that 45 parts of styrene are substituted for 45 parts of ethyl acrylate. Similar results are obtained.

EXAMPLE 9

Same as in Example 7, with the exception that instead of 45 parts of ethyl acrylate, there are used 22.5 parts of styrene and 22.5 parts of ethyl acrylate. Similar results are obtained.

EXAMPLE 10

| | Parts |
|---|---|
| Methylstyrene (about 30% of ortho, 3% of meta, and 67% of para isomers) | 97–99 |
| Dimethyl beta-cyanovinylamine | 1–3 |
| Benzoyl peroxide | 0.5 | are mixed together and charged to a heavy-walled glass tube, which thereafter is sealed under vacuum. Polymerization of the polymerizable liquid is allowed to proceed for seven days at room temperature (20°–30° C.) and then for from 3–7 days at 60° C. to yield a hard copolymer of dimethyl beta-cyanovinylamine and the above-described methylstyrene. It can be used alone or admixed with a dye, pigment, plasticizer, opacifier, filler, or other effect agent, as a thermoplastic molding composition.

Instead of the specific mixture of isomers of methylstyrene employed in the foregoing example, one advantageously can use a mixture of isomers of methylstyrene containing: from about 25% to about 40% orthomethylstyrene; less than about 5% meta-methylstyrene; and from about 60% to about 75% para-methylstyrene. A particularly useful composition is one wherein the meta isomer is less than about 2% by weight, the ortho isomer is present in the polymer in a weight ratio of from about 28% to about 35%, while the para isomer is present in the polymer in a weight ratio of from about 65% to about 72%.

EXAMPLE 11

A. *Preparation of di-(2-ethylhexyl) beta-cyanovinylamine*

(III)

$$C_4H_9-CH-CH_3$$
$$\quad | \quad C_2H_5$$
$$\qquad \searrow N-CH=CHCN$$
$$C_4H_9-CH-CH_3$$
$$\quad | \quad C_2H_5$$

A mixture of 25.8 parts of di-2-ethylhexylamine and 20.4 parts of triethylamine is added to a solution of 17.5 parts of beta-chloroacrylonitrile in 80 parts of benzene at 20° C. The by-product amine hydrochloride is filtered off, and two distillations at reduced pressure give 12.0 parts of di-(2-ethylhexyl) beta-cyanovinylamine boiling at 160° C./0.4 mm.; $n_D^{25}$ 1.4903.

B. *Preparation of a copolymer of cyclohexyl acrylate and di-(2-ethylhexyl) beta-cyanovinylamine*

A mixture of

| | Parts |
|---|---|
| Di-(2-ethylhexyl) beta-cyanovinylamine | 15 |
| Cyclohexyl acrylate | 85 |
| Benzoyl peroxide | 1 | is heated for 30 hours at 50° C. to yield a viscous, resinous copolymer of the aforementioned monomers that is useful as a component of adhesive and impregnating compositions.

Instead of all or part of the particular acrylate employed in certain of the foregoing examples, one can use an equivalent amount of any of the other alkyl (including cycloalkyl) acrylates and alkacrylates (specifically methacrylates), especially the lower alkyl acrylates and methacrylates, e.g., the propyl to hexyl, inclusive acrylates, and the methyl to hexyl, inclusive, methacrylates; also, the corresponding alpha-chloracrylates.

EXAMPLE 12

A. *Preparation of mono-cyclohexyl beta-cyanovinylamine*

(IV) 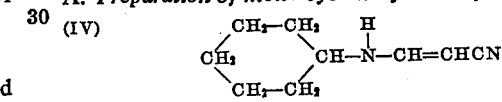

To a stirred solution of 17.5 parts of beta-chloroacrylonitrile and 20.4 parts of triethylamine in 80 parts of benzene is added 19.8 parts of cyclohexylamine at 25°–30° C. After removal of the by-product amine hydrochloride by filtration, 5.2 parts (20%) of mono-cyclohexyl beta-cyanovinylamine is obtained from the cooled filtrate as light-yellow crystals melting at 101.9°–102.8° C.

Calcd. for $C_8H_{12}N_2$: C, 71.96; H, 9.39; N, 18.65. Found: C, 72.03; H, 9.50; N, 18.95.

B. *Preparation of a ternary polymer of vinyl acetate, methyl methacrylate and mono-cyclohexyl beta-cyanovinylamine*

| | Parts |
|---|---|
| Vinyl acetate | 30 |
| Methyl methacrylate | 50 |
| Mono-cyclohexyl beta-cyanovinylamine | 20 |
| Benzoyl peroxide | 1 | are mixed together and charged to a heavy-walled glass tube, which thereafter is sealed under vacuum. Copoymerization is effected by heating the sealed tube in a 60° C. water bath for 20 hours and then in a 75° C. water bath for another 20 hours. A hard ternary polymer of the aforementioned monomers is obtained. It is useful as a molding composition and as a component of coating compositions.

EXAMPLE 13

| | Parts |
|---|---|
| Dimethyl beta-cyanovinylamine | 10.0 |
| 2-amino-4,6-dialloxy-1,3,5-triazine | 40.0 |
| Ethylene glycol fumarate (solid) | 50.0 |
| Wood flour | 66.7 |
| Benzoyl peroxide | 0.5 |

The above ingredients are mixed and dry-blended by tumbling on rollers for several hours, compacted on small mixing rolls by three passes on cold rolls and sheeting out on the final pass. The rolls are at room temperature at the start, with no circulation of either steam or water, but tend to warm somewhat as processing progresses.

On the final pass, the warm sheet is soft and plastic as stripped from the rolls, but becomes hard and stiff upon cooling. The sheets are broken to form a molding composition, a sample of which is molded for 5 minutes at 100° C. under a pressure of about 50 pounds per square inch. During sheeting and molding, the ethylene glycol fumarate copolymerizes with the dimethyl beta-cyanovinylamine and the 2-amino-4,6-dialloxy-1,3,5-triazine. A hard, tough, molded article having a good surface appearance is obtained.

Similar results are obtained when pulverized mica (325 mesh) is substituted for wood flour in the above formula.

EXAMPLE 14

|  | Parts |
| --- | --- |
| Acrylamide | 35 |
| Acrylic acid | 35 |
| Di-n-propyl beta-cyanovinylamine | 30 |
| Alpha,alpha'-Azodiisobutyronitrile | 1 | are charged to a reaction vessel, and the resulting mixture is heated therein, with stirring, on a steam bath for 4 hours, yielding a sticky, viscous ternary polymer of acrylamide, acrylic acid, and di-n-propyl beta-cyanovinylamine. It can be used, for instance, as a thickening agent or as a modifier of urea-formaldehyde, melamine-formaldehyde, and other synthetic resins and molding compositions which have insufficient plasticity during molding, thereby to improve their flow characteristics.

EXAMPLE 15

A pulverized mixture of

|  | Parts |
| --- | --- |
| Ethylene glycol fumarate sebacate (4:3:1 molar ratio) | 200 |
| Methylene bis-acrylamide | 70 |
| Mono-cyclohexyl beta-cyanovinylamine | 30 |
| Benzoyl peroxide | 3 | is spread evenly between 5 ply of ECC–11–112 Fiberglas cloth, and the combination is held under slight pressure in a Carver press for about 30 minutes at about 160° C., during which period copolymerization takes place between the ethylene glycol fumarate sebacate (an unsaturated alkyd resin), methylene bis-acrylamide, and mono-cyclohexyl beta-cyanovinylamine. In the well-impregnated portions of the Fiberglas cloth, the resin becomes hard and brittle and the panel stiff. Barcol hardness tests on the impregnated cloth (panel) average about 28.

EXAMPLE 16

The resin mixture of Example 15 is spread evenly between 6 ply of #720 paper and the combination is subjected to the same curing conditions as the Fiberglas laminate of Example 15. The resulting panel is stiff with a Barcol hardness averaging about 38.

It will be understood, of course, by those skilled in the art that our invention is not limited to the specific ingredients named in the above illustrative examples nor to the particular proportions and methods of polymerization mentioned therein. Thus, instead of using the particular beta-cyanovinylamine specified in an individual example, there can be used in place of all or part of it any other beta-cyanovinylamine of the kind embraced by Formula I. Also, instead of employing the beta-cyanovinylamine and the other comonomer or comonomers in the particular proportions given in the various examples, they can be used in any other proportions, as desired or as conditions may require, for instance in the proportions mentioned by way of illustration in the portion of the specification prior to the examples.

A comonomer (or plurality of comonomers) which contains one or more $CH_2=C<$ groupings, which is different from the beta-cyanovinylamine and which is compatible and copolymerizable therewith, other than the particular comonomers given in the above illustrative examples, also can be used. For instance, the comonomer may be a cyanoalkyl ester of an acrylic acid, e.g., mono-, di-, and tri-cyanomethyl esters of acrylic acid, methacrylic acid, etc., the mono-, di-, and tri-(beta-cyanoethyl) esters of acrylic acid, methacrylic acid, etc. Or, the comonomer can be any other organic compound which is copolymerizable with the beta-cyanovinylamine and which is represented by the general formula (V) 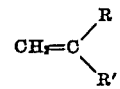

where R represents a member of the class consisting of hydrogen, halogen (chlorine, fluorine, bromine, or iodine), alkyl (e.g., methyl, ethyl, propyl, butyl to octadecyl, inclusive), including cycloalkyl (e.g., cyclohexyl, etc.), aryl (e.g., phenyl, xenyl, naphthyl, etc.) alkaryl (e.g., tolyl, xylyl, ethylphenyl, etc.), aralkyl (e.g., benzyl, phenylethyl, etc.) and R' represents an aryl radical or a radical represented by the formula

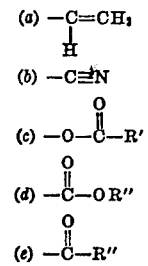

where R'' represents an alkyl, alkoxyalkyl (e.g., methoxymethyl, methoxyethyl, ethoxyethyl, ethoxypropyl, propoxybutyl, etc.) or a carbocyclic radical (e.g., aryl, alkaryl, hydroaromatic, etc.). Examples of compounds embraced by Formula V are the vinyl esters (e.g., vinyl acetate, etc.), methyl vinyl ketone, isoprene, 1,3-butadiene, 2-chloro-1,3-butadiene, acrylonitrile, various esters of acrylic acid (e.g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art.

Although many of the new copolymers, more particularly the acrylonitrile copolymers, of this invention are particularly useful in the formation of fibers or filaments having improved properties over that provided by homopolymeric acrylonitrile, both they and other copolymers of the present invention also have numerous other applications in the plastics and coating arts. For instance, with or without a filler or other additive, they may be used as molding compositions (or as components of molding compositions) from which molded articles are produced by molding the compositions under heat and pressure, e.g., temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions can be used in the production of castings of any desired shape or size; as adhesives; in the treatment of paper or paper stock, or textile materials; in coating compositions; and for various other purposes. The polymeric material can be formed in situ after application of the monomeric material to the base to be coated, impregnated or otherwise treated. The water-soluble and/or organic solvent-soluble polymers of this invention also can be used in similar applications, as well as in others, for instance: as modifiers, more particularly plasticizers, of aminoplast, phenoplast, and other synthetic resins; as components of soil-conditioning, soil-stabilization, and grouting compositions; and for many other purposes that will be apparent to those skilled in the art from the foregoing description.

Fibers can be produced from the acrylonitrile copolymers of the present invention in the manner described in, for example, Cresswell Patents 2,558,730 and 2,558,- 731 and Cresswell and Wizon Patent 2,558,733. Products (including textile materials) comprising an oriented fiber comprised of an acrylonitrile copolymer of this invention can be made into various forms such as blankets, carpets, knit garments, spun fabrics, such as worsteds, or, in general, any fabric in which a wool-like character is desirable.

We claim:

1. A composition comprising a copolymer of copolymerizable ingredients including (1) a beta-cyanovinylamine represented by the general formula

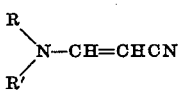

where R represents an alkyl radical and R' represents a member of the class consisting of hydrogen and alkyl radicals, and (2) a compound that contains a $CH_2=C<$ grouping.

2. A composition as in claim 1 wherein the compound of (1) is dimethyl-beta-cyanovinylamine.

3. A composition as in claim 1 wherein the compound of (1) is di-n-propyl-beta-cyanovinylamine.

4. A composition as in claim 1 wherein the compound of (2) is a vinyl compound.

5. A composition as in claim 4 wherein the vinyl compound is a vinyl aromatic compound.

6. A composition as in claim 5 wherein the vinyl aromatic compound is a vinyl aromatic hydrocarbon.

7. A composition as in claim 6 wherein the vinyl aromatic hydrocarbon is styrene.

8. A composition as in claim 4 wherein the vinyl compound is a vinyl aliphatic compound.

9. A composition as in claim 8 wherein the vinyl aliphatic compound is acrylonitrile.

10. A composition as in claim 8 wherein the vinyl aliphatic compound is acrylamide.

11. A composition comprising a copolymer obtained by polymerization of a mixture of copolymerizable ingredients including (1) a beta-cyanovinylamine represented by the general formula

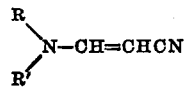

where R represents an alkyl radical and R' represents a member of the class consisting of hydrogen and alkyl radicals, and (2) acrylonitrile, the compound of (1) constituting from about 5% to about 40% by weight of the total amount of (1) and (2).

12. A product comprising an oriented fiber comprised of a copolymer obtained by polymerization of a mixture of copolymerizable ingredients including (1) a beta-cyanovinylamine represented by the general formula

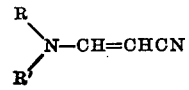

where R represents an alkyl radical and R' represents a member of the class consisting of hydrogen and alkyl radicals, and (2) acrylonitrile, the compound of (1) constituting from about 5% to about 30% by weight of the total amount of (1) and (2).

13. The method of preparing a new synthetic composition which comprises polymerizing, with the aid of a polymerization catalyst, a polymerizable composition comprising (1) a beta-cyanovinylamine represented by the general formula

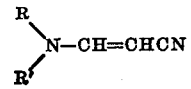

where R represents an alkyl radical and R' represents a member of the class consisting of hydrogen and alkyl radicals, and (2) a compound that contains a $CH_2=C<$ grouping.

References Cited in the file of this patent

UNITED STATES PATENTS

| | | |
|---|---|---|
| 2,211,152 | Nicodemus et al. | Aug. 13, 1940 |
| 2,451,852 | McLamore | Oct. 19, 1948 |
| 2,459,420 | Erickson | Jan. 18, 1949 |
| 2,540,949 | Jones | Feb. 6, 1951 |
| 2,626,946 | Price et al. | Jan. 27, 1953 |
| 2,659,715 | Coover et al. | Nov. 17, 1953 |
| 2,775,567 | Basdekis | Dec. 25, 1956 |